United States Patent
Chen

(10) Patent No.: US 8,917,364 B2
(45) Date of Patent: Dec. 23, 2014

(54) PIXEL ARRAY AND FABRICATION THEREOF

(75) Inventor: Hsiao-hsien Chen, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 402 days.

(21) Appl. No.: 13/378,048

(22) PCT Filed: Nov. 9, 2011

(86) PCT No.: PCT/CN2011/081970
§ 371 (c)(1),
(2), (4) Date: Dec. 14, 2011

(87) PCT Pub. No.: WO2013/063821
PCT Pub. Date: May 10, 2013

(65) Prior Publication Data
US 2013/0114011 A1 May 9, 2013

(30) Foreign Application Priority Data
Nov. 3, 2011 (CN) .......................... 2011 1 0343614

(51) Int. Cl.
*G02F 1/1333* (2006.01)
*G02F 1/1335* (2006.01)
*G02F 1/1362* (2006.01)

(52) U.S. Cl.
CPC .... *G02F 1/133514* (2013.01); *G02F 1/133516* (2013.01); *G02F 2001/136222* (2013.01); *G02F 1/136213* (2013.01)
USPC .............. 349/38; 349/106; 349/187; 430/321

(58) Field of Classification Search
CPC .............. G02F 1/133514; G02F 2001/136222; G02F 1/136213; G02F 1/133516
USPC .......... 349/38, 39, 106, 107, 187; 430/7, 321, 430/319; 345/88
See application file for complete search history.

(56) References Cited

U.S. PATENT DOCUMENTS

| | | | | |
|---|---|---|---|---|
| 2003/0085404 A1* | 5/2003 | Kim et al. | ......... | 257/72 |
| 2004/0263709 A1* | 12/2004 | Kim | ......... | 349/43 |
| 2005/0122442 A1* | 6/2005 | Park | ......... | 349/43 |
| 2008/0185589 A1* | 8/2008 | Shin et al. | ......... | 257/59 |

* cited by examiner

*Primary Examiner* — Dung Nguyen
*Assistant Examiner* — Tai Duong

(57) ABSTRACT

A pixel array is disclosed that comprises a storage capacitor, and the pixel array is coated with a color filter area, where the color filter areas comprises a first color filter area of the storage capacitor and a second color filter area of the regions beyond the storage capacitor. The thickness of the first color filter area is bigger than the thickness of the second color filter area, and the thickness of the regions beyond the storage capacitor is equivalent to the minimum value of thickness that retains the color chroma of the pixel array, which enables a pixel to hold the desired potential within a frame cycle while the area of the storage capacitor is diminished. The invention further provides a fabrication method of the pixel array.

12 Claims, 4 Drawing Sheets

PIXEL ARRAY AND FABRICATION THEREOF

BACKGROUND OF THE INVENTION

1. Field of the Invention

The present invention relates to liquid crystal display techniques domain. More particularly, the present invention relates to a pixel array and its fabrication method.

2. Description of the Prior Art

The more the advancement of the liquid crystal display techniques, the more the demand for the features of the liquid crystal display.

The color filter on array (COA) of a liquid crystal display comprises a liquid crystal unit, and the liquid crystal unit is provided with a storage capacitor. Referring to FIG. 1, FIG. 1 is a top view of the COA of the conventional techniques, which comprises: R, G, and B pixels in turn. The storage capacitor 11 is fabricated in each pixel. Once the COA selects a normal mask for its surface, every region of the COA has a uniform thickness.

For instance, referring to FIGS. 2A and 2B, FIG. 2A is a sectional view of the storage capacitor 11, and FIG. 2B is a sectional view of the other regions beyond the storage capacitor 11. On the conventional techniques, since the color filter area on each pixel is fabricated by the irradiation through the normal mask; therefore, the thickness of each region in the pixel is the same, which means the thickness t1 of the storage capacitor 11 equals to the thickness t2 of the other regions beyond the storage capacitor 11.

Since the surface area of the storage capacitor 11 is bigger, the aperture rate therefore decreases, which further diminishes the overall transmittance. However, if the surface area s1 of the storage capacitor 11 is reduced directly, the capacitance of the COA is surely lessened, which further affects the holding ratio of the electric potential of the COA.

SUMMARY OF THE INVENTION

An objective of the present invention is to provide a pixel array that is capable of retaining the desired potential as the area of the storage capacitor is lessened.

To settle the aforementioned issue, the present invention provides a pixel array, comprising a storage capacitor; the pixel array is coated with color filter areas, where the color filter areas comprises a first color filter area of the storage capacitor and a second color filter area of the other regions beyond the storage capacitor; wherein the thickness of the first color filter area is bigger than the thickness of the second color filter area, and the thickness of the other regions beyond the storage capacitor is equivalent to the minimum value of thickness that retains the color chroma of the pixel array, which enables the pixel unit to hold the desired potential within a frame cycle while the area of the storage capacitor is diminished; wherein the second color filter area is formed by irradiation through a gray-tone or a half-tone mask.

In the pixel array of the present invention, the material used for the color filter area is negative photoresist.

In the pixel array of the present invention, the color filter area belongs to one of red color filter, green color filter and blue color filter.

The other objective of the present invention is to provide a pixel array that is capable of holding the desired potential as the area of the storage capacitor is lessened.

To settle the aforementioned issues, the present invention provides a pixel array, comprising a storage capacitor; the pixel array is coated with color filter areas, where the color filter areas comprises a first color filter area of the storage capacitor and a second color filter area of the other regions beyond the storage capacitor; the thickness of the first color filter area is bigger than the thickness of the second color filter area, and the thickness of the other regions beyond the storage capacitor is equivalent to the minimum value of thickness that retains the color chroma of the pixel array, which enables the pixel unit to hold the desired potential within a frame cycle while the area of the storage capacitor is diminished.

In the pixel array of the present invention, the second color filter area is formed by irradiation through a gray-tone mask.

In the pixel array of the present invention, the second color filter area is formed by irradiation through a half-tone mask.

In the pixel array of the present invention, the material used for the color filter area is negative photoresist.

In the pixel array of the present invention, the color filter area belongs to one of red color filter, green color filter and blue color filter.

Another objective of the present invention is to provide a fabrication method of a pixel array that is capable of retaining the desired potential as the area of the storage capacitor is lessened.

To settle the aforementioned issues, the present invention provides a fabrication method of a pixel array, and the pixel array is provided with storage capacitors; the method comprises the following steps:

coating the pixel array with color filter areas;

disposing the other regions beyond the storage capacitor with a gray-tone or a half-tone mask; and irradiating the color filter areas of the pixel array through a gray-tone mask or a half-tone mask that enables the color filter area of the storage capacitor to form a first color filter area, and enables the other regions beyond the storage capacitor to form a second color filter area.

In the fabrication method of the pixel array of the present invention, the thickness of the first color filter area is bigger than the thickness of the second color filter area, and the thickness of the other regions beyond the storage capacitor is equivalent to the minimum value of thickness that retains the color chroma of the pixel array, which enables the pixel to hold the desired potential within a frame cycle while the area of the storage capacitor is diminished.

In the fabrication method of the pixel array of the present invention, the material used for the color filter area is negative photoresist.

In the fabrication method of the pixel array of the present invention, the color filter area belongs to one of red color filter, green color filter and blue color filter.

Relative to the prior techniques, the pixel array of the present invention holds the desired potential within a frame cycle while the area of the storage capacitor is diminished.

This invention is detailed described with reference to the following preferred embodiments and the accompanying drawings for better comprehension.

DETAILED DESCRIPTION OF THE INVENTION

The following embodiments are described with reference to the following accompanying drawings which exemplify the realizations of this invention.

Figure 3:
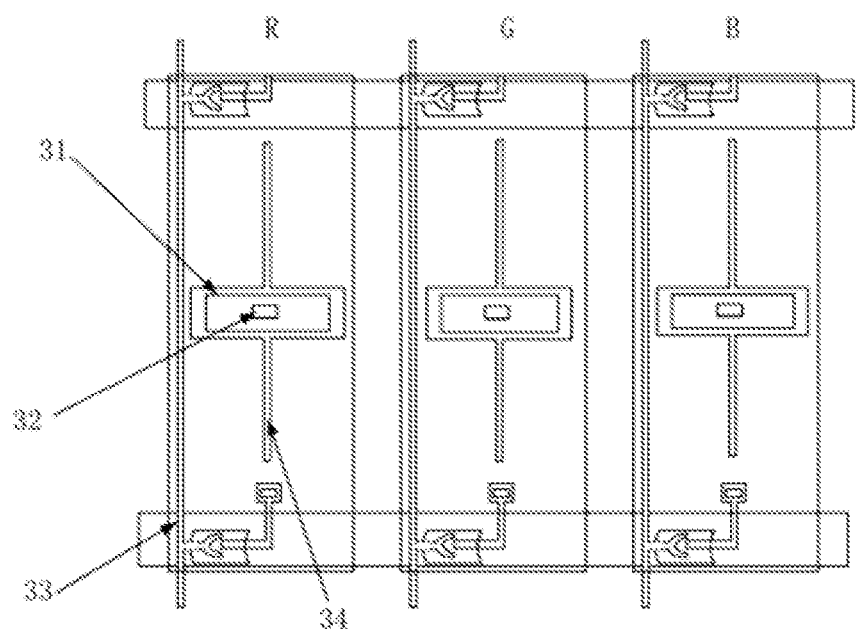
FIG. 3 is a top view of the pixel array of the preferred embodiment of the present invention.

Referring to FIG. 3, FIG. 3 is a top view of the pixel array of the preferred embodiment of the present invention.

In an embodiment shown in FIG. 3, the pixel array comprises: R, G, B pixels reiterating in this pattern. Each pixel contains a storage capacitor 31, and the storage capacitor 31 is provided with a via hole 32. Each pixel further comprises a data line 33 and a common electrode line 34.

Figure 4A:
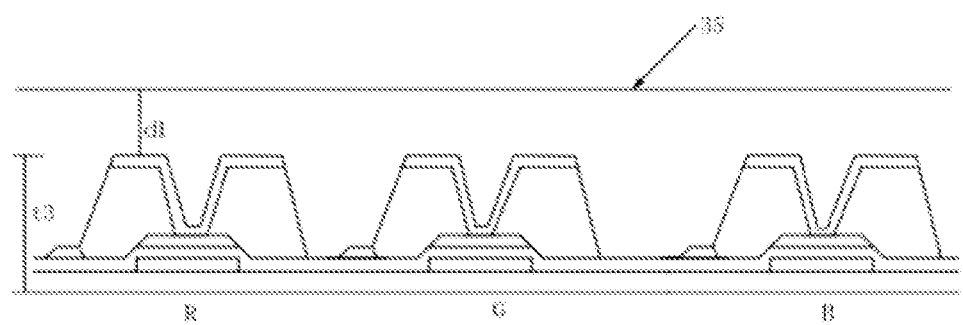
FIGS. 4A and 4B are top views at different area of the pixel array shown in FIG. 3 of the preferred embodiments of the present invention.
Figure 4B:
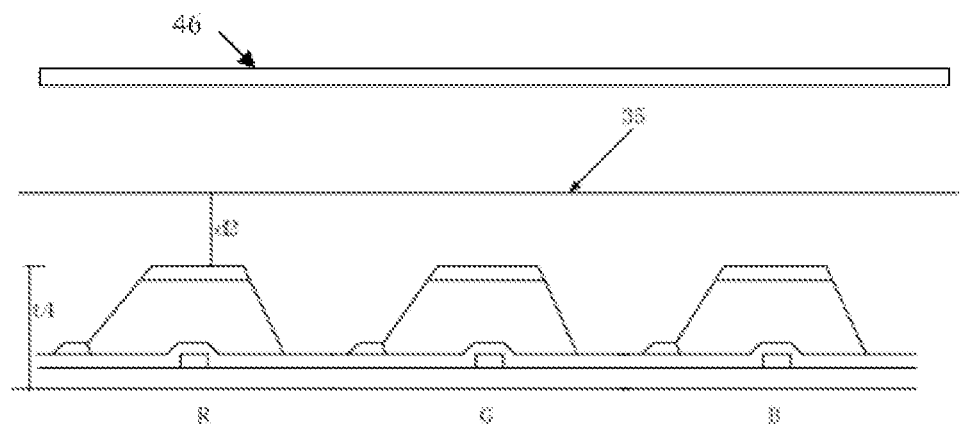

Referring to FIGS. 4A and 4B, FIG. 4A is a sectional view of the storage capacitor 31, and 4B is a sectional view of the other regions beyond the storage capacitor 31. In this embodiment, the pixel array is coated with color filter areas, where the color filter areas comprises a first color filter area of the storage capacitor 31 and a second color filter area of the other regions beyond the storage capacitor 31. In this embodiment, the thickness of the first color filter area is bigger than the thickness of the second color filter area.

In this embodiment, the material used for the color filter area is negative photoresist, and the color filter area belongs to one of red color filter, green color filter and blue color filter.

In a specific realization, the first color filter area is formed by irradiation through a normal mask. And the second color filter area is formed by irradiation through a gray-tone or a half-tone mask 46. Of course, the second color filter area may be formed by any other masks, provided that the thickness of the first color filter area is bigger than the thickness of the second color filter area, and there is no detailed enumeration hereto.

Referring to FIGS. 4A and 4B, the thickness t3 of the storage capacitor 31 that is to form the first color filter area is bigger than the thickness t4 of the other regions that is to form the second color filter area.

In a specific realization, if the pixel array is required to retain its chroma, the thickness t4 of the other regions beyond the storage capacitor 31 has to reach a certain depth, which means the distance d1 between the common electrode line 34 of that area and the color filter electrode line 35 becomes shorter, and the thickness t3 of the storage capacitor 31 will become thicker that facilitates the distance d1 between the common electrode line 34 of the storage capacitor 31 and the color filter electrode line 35 becomes shorter, and eventually leading to a shorter distance d between the common electrode line 34 and the color filter electrode line 35.

According to a formula:

$$C = \epsilon A/d;$$

as d decreases, the capacitance of the liquid crystal capacitor Clc (not shown in the figure) increases. Even if the area of the storage capacitor 31 reduces to s2, that is s2<s1, the pixel array still holds the desired potential within a frame cycle. Moreover, as the area of the storage capacitor 31 decreases, which boosts the aperture rate, and the overall penetration of the pixel array will surely be lifted.

Figure 1:
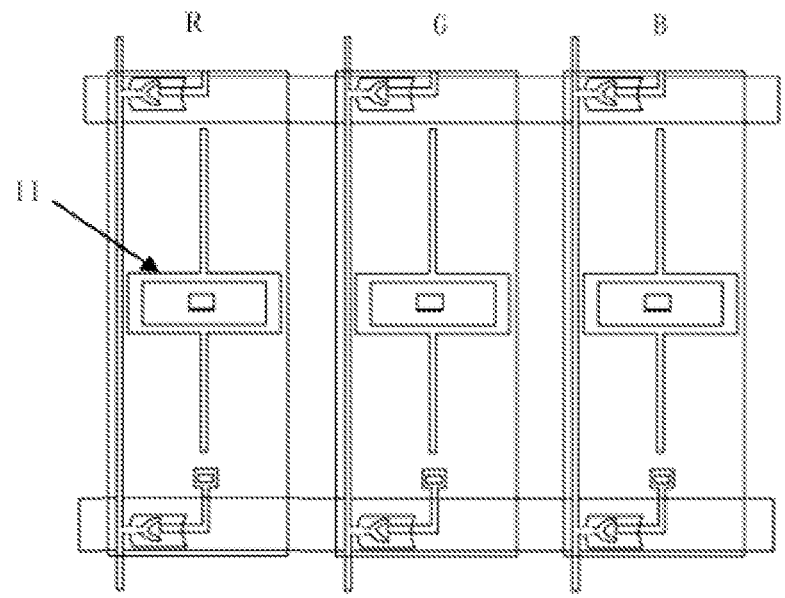
FIG. 1 is a top view of the color filter on array according to the conventional techniques.
Figure 2A:
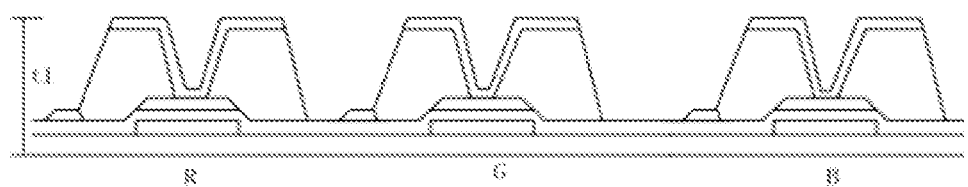
FIGS. 2A and 2B are sectional diagrams of the color filter on array viewing at different area according to the conventional techniques.
Figure 2B:
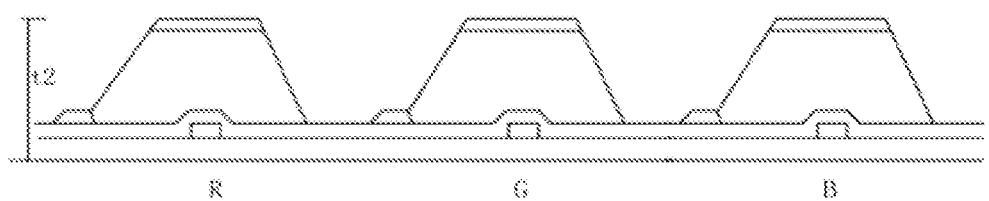

In the pixel array of this invention, the pixel array forms a first color filter area at the storage capacitor 31, and forms a second color filter area at the other regions beyond the storage capacitor 31. And the thickness of the first color filter area is bigger than the thickness of the second color filter area, which enables the thickness t3 of the storage capacitor 31 bigger than the thickness t4 of the other regions beyond the storage capacitor 31. Furthermore, in the present invention, the area s2 of the storage capacitor 31 is smaller than the area s1 of the storage capacitor 11 (FIG. 1) of conventional techniques. The thickness t4 of the other regions beyond the storage capacitor 31 is supposed to equal the minimum value of thickness that retains the color chroma of the pixel array. The increasing of the thickness t4 of the other regions beyond the storage capacitor 31 will facilitate to increase the thickness t3 of the storage capacitor 31, which shortens the distance d between the common electrode line 34 and the color filter electrode line 35, and the capacitance of the liquid crystal capacitor Clc is lifted. At the moment, even if the area of the storage capacitor is reduced, the pixel array still holds the desired potential within a frame cycle.

Figure 5:
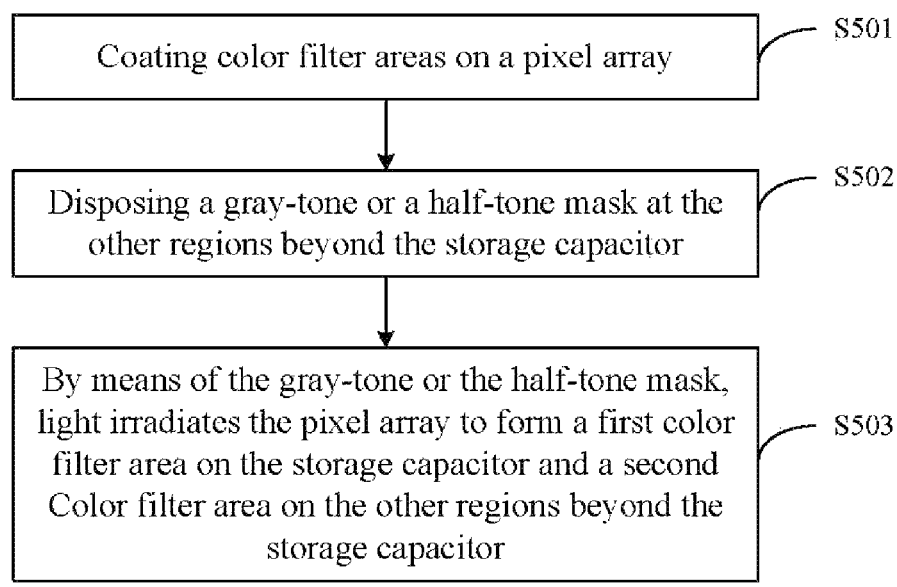
FIG. 5 is a flow chart of the fabrication method of the pixel array of the preferred embodiment of the present invention.

FIG. 5 is a flow chart of the fabrication method of the pixel array of the preferred embodiment of the present invention, wherein the pixel array comprises storage capacitors.

In step S501: coating a color filter area on the pixel array.

In step S502: disposing the other regions beyond the storage capacitor with a gray-tone or a half-tone mask.

In step S503: irradiating the color filter areas of the pixel array through a gray-tone mask or a half-tone mask that enables the color filter area of the storage capacitor to form a first color filter area, and enables the other regions beyond the storage capacitor to form a second color filter area.

In a specific realization, the thickness of the first color filter area is bigger than the thickness of the second color filter area, and the thickness of the other regions beyond the storage capacitor is equivalent to the minimum value of thickness that retains the color chroma of the pixel array, which enables the pixel to hold the desired potential within a frame cycle while the area of the storage capacitor is diminished.

Preferably, the material used for the color filter area is negative photoresist.

Preferably, the color filter area belongs to one of red color filter, green color filter and blue color filter.

Please refer to the aforementioned description about the pixel array of the present invention, and there is no more detailed enumeration hereto.

In conclusion, the preferred embodiments of this invention are disclosed above; however, the aforesaid exemplified embodiments of the present invention are used not for the constraint of the scope; any equivalent modifications, made by those with common knowledge in the field of the present invention, without departing from the spirit and scope of the present invention are therefore intended to be embraced. The present invention is intended to be limited only by the scope of the appended claims.

What is claimed is:

1. A pixel array, comprising a storage capacitor, characterized in that:
   the pixel array is coated with a color filter area, wherein the color filter area comprises a first color filter area of the storage capacitor and a second color filter area of regions beyond the storage capacitor;
   wherein a thickness of the first color filter area is bigger than a thickness of the second color filter area, and a thickness of the second color filter area of the regions beyond the storage capacitor is equivalent to the minimum value of thickness that retains a color chroma of the pixel array that enables a pixel unit to hold a desired potential within a frame cycle while an area of the storage capacitor is diminished;
   wherein the second color filter area is formed by irradiation through a gray-tone or a half-tone mask.

2. The pixel array as claimed in claim 1, characterized in that: the material used for the color filter area is negative photoresist.

3. The pixel array as claimed in claim 1, characterized in that: the color filter area belongs to one out of red color filter, green color filter and blue color filter.

4. A pixel array, comprising a storage capacitor, characterized in that:
the pixel array is coated with a color filter area, wherein the color filter area comprises a first color filter area of the storage capacitor and a second color filter area of regions beyond the storage capacitor;
wherein a thickness of the first color filter area is bigger than a thickness of the second color filter area, and a thickness of the second color filter area of the regions beyond the storage capacitor is equivalent to a minimum value of thickness that retains a color chroma of the pixel array that enables a pixel unit to hold a desired potential within a frame cycle while an area of the storage capacitor is diminished.

5. The pixel array as claimed in claim 4, characterized in that: the second color filter area is formed by irradiation through a gray-tone mask.

6. The pixel array as claimed in claim 4, characterized in that: the second color filter area is formed by irradiation through a half-tone mask.

7. The pixel array as claimed in claim 4, characterized in that: the material used for the color filter area is negative photoresist.

8. The pixel array as claimed in claim 4, characterized in that: the color filter area belongs to one out of red color filter, green color filter and blue color filter.

9. A fabrication method of a pixel array, wherein the pixel array is provided with a storage capacitor, characterized in that: the fabrication method comprises the following steps:
coating the pixel array with a color filter area;
disposing regions beyond the storage capacitor with a gray-tone or a half-tone mask; and
irradiating the color filter area of the pixel array through the gray-tone mask or the half-tone mask that enables the color filter area of the storage capacitor to form a first color filter area, and enables the regions beyond the storage capacitor to form a second color filter area.

10. The fabrication method of a pixel array as claimed in claim 9, characterized in that: a thickness of the first color filter area is bigger than a thickness of the second color filter area and a thickness of the second color filter area of the regions beyond the storage capacitor is equivalent to a minimum value of thickness that retains a color chroma of the pixel array that enables a pixel to hold a desired potential within a frame cycle while the area of the storage capacitor is diminished.

11. The fabrication method of a pixel array as claimed in claim 9, characterized in that: a material used for the color filter area is negative photoresist.

12. The fabrication method of a pixel array as claimed in claim 9, characterized in that: the color filter area belongs to one out of red color filter, green color filter and blue color filter.

* * * * *